United States Patent Office 3,227,694
Patented Jan. 4, 1966

3,227,694
COPOLYMERS HAVING UNSATURATED SIDE
CHAINS AND THEIR PREPARATION
John E. Masters, Louisville, Ky., assignor, by mesne assignments, to Devoe & Raynolds Company, Inc., a corporation of Delaware
No Drawing. Filed Apr. 3, 1961, Ser. No. 100,023
7 Claims. (Cl. 260—78.5)

This invention pertains to the production of new and improved resinous compositions eminently suitable as binders for laminates, adhesives and the like, as well as for varnishes, films, fibers and similar compositions.

The new and improved resinous compositions of this invention are carboxy copolymers which are further reacted by a process permitting the introduction to the copolymer of pendent vinyl side substituents. The compositions are obtained by reacting, through a vinyl interchange reaction, a carboxyl copolymer with certain vinyl esters, carboxyl groups of the copolymer being converted to vinyl ester groups.

Since the reaction of a carboxyl group with a vinyl ester is different from the reaction of other unsaturated or saturated esters with carboxyl groups, the reaction utilized herein for the preparation of vinyl ester copolymers is termed a vinyl interchange. The reaction of an organic acid, or carboxyl group, with an ester such as an alkyl or alkaryl acetate is catlayzed by both acids and bases. However, because a different interchange mechanism takes place, vinyl interchange reactions are to be distinguished from ester-ester interchanges which are also catalyzed by acids and bases.

The vinyl interchange reaction is generally catalyzed by the use of various mercury salts of strong acids, for example, mercuric sulfate, mercuric phosphate and mercury salts of aromatic sulphonic acids, for example, mercuric p-toluene sulphonic acid, mercuric benzene sulphonic acid and mercuric napthalene-2-sulphonic acid, preferably prepared in situ from mercuric acetate and a slight excess over the equivalent amount of aromatic sulphonic acid. Similarly, the sulfate and phosphates are preferably prepared in situ from mercuric acetate and concentrated or fuming sulfuric or phosphoric acid. Only small amounts of these catalysts need be used, as little as two percent or less, say 0.1 to 2 percent being desirable and effective.

The vinyl interchange reaction can be affected at temperatures as low as room temperature up to the normal boiling point of the lowest boiling constituent in the mixture which will usually be the vinyl ester, or at elevated pressures and temperatures, the rate of conversion increasing with rising temperature. It is preferred to carry out the reaction at a temperature of about 80° C., and an excess of the unsaturated ester over the acid is desirable for efficient interchange. The ethylenically unsaturated alcohol ester of a saturated acid is usually used in a ratio of at least three and one-half to ten, preferably five mols of ester per carboxyl group of the copolymer.

Carboxy copolymers which can be used to advantage in preparing the composition of this invention are formed by reacting a monomer containing a single —HC=CH—, that is, a vinylene group, with acrylic acid, methacrylic acid and crotonic acid that is alpha-beta unsaturated monocarboxylic acids of not more than four carbon atoms, as well as maleic or fumaric acids or their saturated monohydric alcohol half esters. Half esters are those formed with saturated alcohols having one to ten carbon atoms.

As indicated, polymerized with the alpha-beta unsaturated acids are monomers copolymerizable therewith containing a single vinylene group. Particularly important are vinyl aromatic compounds, for instance, sytrene, vinyl toluene, alpha-methyl styrene, the halostyrenes, etc. having a single vinyl group and free of other substituents capable of reacting with an unsaturated acid, i.e., a monofunctional vinyl aromatic compound. Also valuable are saturated alcohol esters of acrylic, methacrylic and crotonic acids. Examples of monofunctional unsaturated aromatic monomers are isopropenyl toluene, the various dialkyl styrenes, ortho-, meta- and para-chloro styrenes, bromo styrenes, fluoro styrenes, cyano styrenes, vinyl naphthalene, the various alpha-substituted sytrenes, e.g., alpha-methyl styrenes, alpha-methyl para-methyl sytrenes, as well as various di-, tri- and tetra-chloro, bromo, and fluoro sytrenes. Acrylic, methacrylic and crotonic acid esters of saturated alcohols include the methyl, ethyl, propyl, isopropyl, n-butyl, isobutyl, (sec)butyl, (tert) butyl, amyl, hexyl, heptyl, octyl, decyl, dodecyl, etc., esters of acrylic, methacrylic acids and crotonic acids. Thus, preferred vinylene monomers include alpha-beta unsaturated monocarboxylic acid esters of saturated monohydric alcohols, the acids having not more than four carbon atoms and the alcohols having not more than twenty carbon atoms and monofunctional vinyl aromatic compounds.

Other known vinylene monomers can, of course, be used in the preparation of the carboxyl copolymer. Desirable monomers include vinyl aliphatic cyanides of not more than four carbon atoms, for example, acrylonitrile and methacrylonitrile, as well as monovinyl ethers, e.g., ethyl vinyl ether, ethyl methallyl ether, vinyl butyl ether, methyl vinyl ether and others of not over twenty carbon atoms. Included also are unsaturated monohydric alcohol esters of saturated monobasic acids wherein the alcohols contain a single vinyl group and the acids have not more than 20 carbon atoms, for instance, vinyl acetate, vinyl stearate, and the allyl, methallyl and crotyl esters of propionic, butyric and other acids. Not only the vinylene monomers themselves, but mixtures of these monomers can be copolymerized with the alpha-beta unsaturated acids to form the carboxyl-containing vinyl copolymer. A particularly desirable mixture is a combination of an arcylic or methacrylic ester with styrene or vinyl toluene. Of course, when mixtures are employed a certain degree of selectivity must be exercised. Thus, it is preferred not to use vinyl acetate or similar esters with styrene and the like. Likewise, there will be certain preferred combinations of vinylene monomer and alpha-beta unsaturated acids forming the copolymer. For instance, it is undesirable to use vinyl aromatics, e.g., styrene, with the maleic or fumaric half ester, but rather an acrylic ester or the like.

Copolymers of alpha-beta unsaturated acids and vinylene monomers, such as those disclosed herein, are generally prepared by heating the monomers in a solvent in the presence of a catalyst, e.g., a peroxide and more particularly, an organic peroxide catalyst, in accordance with well known methods. Suitable solvents are xylene and other aromatic hydrocarbon solvents, esters, ketones and mixtures of hydrocarbons with esters and ketones. Catalysts include such peroxides as cumene hydroperoxide, benzoyl peroxide, acetyl peroxide, phthalic peroxide and others. Polymerization temperatures vary from 60° C. to 135° C., depending upon the method used. The copolymer generally will contain from five to forty percent acid and ninety-five to sixty, the total being one-hundred, copolymerizable monomer on a weight basis.

To introduce the unsaturated substituents through the vinyl interchange reaction, the carboxyl copolymer is reacted with such unsaturated alcohol-saturated acid esters as vinyl acetate, vinyl propionate and the like. The mercuric salt is added and the unsaturated ester-carboxyl copolymer mixture is reacted at or near the boiling point of the ester. As indicated hereinbefore, an excess of the ester with respect to carboxyl groups is required. Nevertheless, it is not necessary to bring about an interchange with all of the carboxyl groups present in the copolymer. Three to five mols of vinyl acetate or vinyl propionate per carboxyl group to be converted to vinyl ester groups can be used, the extent of reaction being determined by the amount of acetic acid or propionic acid formed. The carboxyl copolymer will have been made in a solvent, and in many instances, the vinyl interchange reaction can be carried out in the same solvent. It is understood, of course, that since an ester is one of the reactants, esters are not suitable solvents for the reaction. If the carboxyl copolymer has been made in an ester solvent it should be replaced with an aromatic hydrocarbon ketone, or glycol ether prior to vinyl interchange. Likewise alcohols, which will react with carboxyl groups or with acetic or propionic acid formed are unsuitable. Examples of solvents are ketones such as acetone, methyl ethyl ketone, methyl isobutyl ketone, diisobutyl ketone, etc.; ethers such as "Dioxane" (glycol ethylene ether), etc.; and aromatic hydrocarbon solvents such as xylene, toluene, benzene, etc. and mixtures of these solvents.

The conversion of carboxyl groups of carboxyl copolymers to vinyl ester groups in accordance with this invention can best be understood by reference to specific examples. These examples are for the purposes of illustration only and are not intended to place any undue limitations on the invention. In these examples, when "parts" is used, "parts by weight" is intended.

EXAMPLE 1

*Preparation of carboxy copolymers*

| Material | Units | Parts by Weight |
|---|---|---|
| Vinyl Acetate | 63.5 | 445 |
| Crotonic Acid | 36.5 | 256 |
| Benzoyl Peroxide | 4.0 | 28 |

In a two liter, three neck, round bottom flask equipped with thermometer, agitator and reflux condenser, 445 parts of vinyl acetate, 256 parts of crontonic acid and 25 parts of benzoyl peroxide are heated to reflux temperature (78° C. to 85° C.) and held over a period of two hours. At the end of this time, the viscosity of the flask contents has increased to the point where good agitation is not obtained. To control the viscosity, 500 parts of methyl isobutyl ketone is added in 100 part increments during continued heating (108° C. to 110° C.) over a period of five hours. An additional 3 parts of benzoyl peroxide are added to the flask contents after this period of time and refluxing continued for two hours during which time, 100 parts of methyl isobutyl ketone are added to control the viscosity. The resulting product is carboxy copolymer A solution, whose properties are given below.

In accordance with the above procedure, two additional carboxy copolymer B and C solutions are prepared using the following reactants and quantities:

| Materials | Carboxy Copolymer B Parts by Weight | Carboxy Copolymer C Parts by Weight |
|---|---|---|
| Vinyl Acetate | 536 | 350 |
| Crotonic Acid | 164 | 350 |
| Benzoyl Peroxide | 28 | 28 |

The properties of the solutions of carboxy copolymers A, B and C are listed in the following table:

| Carboxy Copolymer Solution | Percent Crotonic Acid in Copolymer | Percent Conversion | Percent Solids in Methyl Isobutyl Ketone | Acid Value (Solids) | Viscosity at 25° C. (When reduced to 40 Percent Non-Volatiles With 2-ethoxy Ethanol Acetate) | Color (at 40 Percent Non-Volatiles |
|---|---|---|---|---|---|---|
| A | 36.5 | 100 | 58.8 | 210 | T-U | 2-3 |
| B | 23.4 | 99 | 58.0 | 156 | P-Q | 2-3 |
| C | 50.0 | 91 | 57.8 | 314 | P-Q | 1-2 |

*Conversion of carboxy copolymer to vinyl copolymer*

Materials: Parts by weight
- Vinyl acetate _____ 655
- Carboxy copolymer A (58.5 percent solids) __ [1]515
- Hydroquinone _____ 6.6
- Mercuric acetate _____ 2.2
- Sulfuric acid (fuming) _____ 0.7
- Sodium acetate _____ 2.0

[1] At 58.5 percent.

Into a two liter, three neck, round bottom flask equipped with thermometer, agitator, and reflux condenser are charged 655 parts of vinyl acetate, 515 parts of copolymer solution A, 6.6 parts of hydroquinone and 2.2 parts of mercuric acetate. To this mixture, 0.7 part of fuming sulfuric acid is added very slowly. The flask contents are then heated to 50° C. and held for five hours. At the end of this time, 2 parts of sodium acetate are added to the flask contents. The temperature is raised to 62° C. and held for 10 minutes in order to dissolve the sodium acetate. The flask is then set up for vacuum distillation and the excess vinyl acetate is distilled off by water aspirator vacuum to 60° C. When the viscosity has increased to the point where good agitation is not obtained, 200 parts of xylene are added and distilled off followed by a second addition of 200 parts of xylene and further distillation.

The heat is then removed, the vacuum released, 100 parts of xylene added to the flask contents, and the resulting solution filtered producing vinyl copolymer $A_1$ having the properties below:

Two additional vinyl copolymers $B_1$ and $C_1$ are prepared in the same manner as above using the following reactants and quantities:

| Materials | Vinyl Copolymer $B_1$ Parts | Vinyl Copolymer $C_1$ Parts |
|---|---|---|
| Carboxy Copolymer B (58.3 Percent Solids Solution) | 515 (58.3 percent) | |
| Carboxy Copolymer C (63.7 Percent Solids Solution) | | 472 (at 63.7 percent). |
| Vinyl Acetate | 420 | 902. |
| Hydroquinone | 4.2 | 9. |
| Mercuric Acetate | 1.5 | 3. |
| Sulfuric Acid (Fuming) | .46 | 0.9. |
| Sodium Acetate | 1.3 | 2.6. |

The properties of the three vinyl copolymers are listed in the following table:

PROPERTIES

| Vinyl Copolymer | Percent Solids (In Xylene) | Acid Value (Solution) | Viscosity at 25° C. (at 54 Percent Solids) | Color (at 54 Percent NVM) | Iodine No. (Solids) |
|---|---|---|---|---|---|
| $A_1$ | 59 | 41 | $Z_1$-$Z_2$ | 6-7 | 61 |
| $B_1$ | 64 | 38 | Incompatible | 7-8 | 38 |
| $C_1$ | 54 | 68 | Y-Z | 4-5 | 73 |

EXAMPLE 2

*Preparation of carboxy copolymer*

| Materials | Units | Parts by Weight |
|---|---|---|
| Vinyl Acetate | 90 | 630 |
| Crotonic Acid | 10 | 70 |
| Benzoyl Peroxide | 4 | 28 |
| Hydroquinone | .286 | 2 |
| Vinyl Acetate | | 700 |

In a two liter, three neck, round bottom flask equipped with thermometer, agitator and reflux condenser, 630 parts of vinyl acetate, 70 parts of crotonic acid, and 28 parts of benzoyl peroxide are heated with agitation to reflux temperature (78° C.) and held over a period of two hours. At the end of this time, the heat is removed from the flask contents and two parts of hydroquinone dissolved in 700 parts of vinyl acetate are added. The flask contents are then cooled with ice water to room temperature. The resulting carboxy copolymer D solution has the following properties:

| Percent Crotonic Acid in Copolymer | Percent Conversion | Percent Solids | Acid Value (Solids) | Acid Value (Solution) | Viscosity | Color |
|---|---|---|---|---|---|---|
| 15 | 66 | 32.9 | 110 | 36.1 | F | 1 |

*Conversion of carboxy copolymer to vinyl copolymer*

In a two liter, three neck, round bottom flask equipped with thermometer, agitator and reflux condenser are charged 1418 parts of carboxy copolymer D solution and 2.34 parts of mercuric acetate with agitation. To this mixture is added very slowly with stirring, .72 part of fuming sulfuric acid. When all of the fuming sulfuric acid has been added, the flask contents are heated to 50° C. and held for six hours. At the end of this time, 2 parts of sodium acetate hydrate and 1 part of hydroquinone (to further inhibit vinyl polymerization), are added to the reaction mixture and the temperature is raised to 60° C. and held for 10 minutes in order to dissolve the sodium acetate hydrate. The flask contents are then distilled under vacuum to remove excess vinyl acetate and acetic acid. The vinyl copolymer solution when thinned to 40 percent solids with Cellosolve acetate and xylene has a color of 10, viscosity of S and acid value of 11.3 (9.3 on solution if solution were 32.9 percent N.V.).

EXAMPLE 3

*Part I*

| Materials | Units | Parts by Weight |
|---|---|---|
| Acrylic Acid | 25 | 200 |
| Ethyl Acrylate | 40 | 320 |
| Vinyl Toluene | 35 | 280 |
| Benzoyl Peroxide | | 16 |

In a two liter, three neck, round bottom flask equipped with thermometer, agitator and reflux condenser, 700 parts of methyl isobutyl ketone are heated to 117° C., at which temperature the monomer solution made up of 200 parts of acrylic acid, 320 parts of ethyl acrylate and 280 parts of vinyl toluene are added dropwise by means of a dropping funnel over a period of three and one-half hours. After all of the monomer solution has been added, a catalyst solution made up of 16 parts of benzoyl peroxide dissolved in 50 parts of methyl isobutyl ketone is added to the flask contents dropwise over a period of one hour. After all of the catalyst solution has been added, the temperature of the flask contents is held at 117° C. for an additional two hours. The resulting 49 percent solids carboxy copolymer solution has an acid value of 97 (solution).

*Part II*

In a two liter flask equipped with thermometer, agitator, and reflux condenser, 576 parts of the copolymer solution of Part I, 300 parts of vinyl acetate, 1.8 parts of hydroquinone, 5.1 parts of mercuric acetate and 6.1 parts of p-toluene sulfonic acid are heated to reflux (80° C.) and held for thirty minutes. At the end of this time the flask contents are cooled to 50° C. and held for a period of two hours. To the reaction mixture are then added 4 parts of sodium acetate. The flask is then set up for distillation and the flask contents are heated to 120° C. The excess vinyl acetate is distilled off at 120° C. over a period of two hours. During the distillation, xylene is added to control the viscosity. The resulting solution is filtered producing a 38.2 percent solids vinyl copolymer solution having a color of 11, an acid valve of 30.16 (based on solids) and a viscosity of 0.

What is claimed is:

1. A process for the preparation of a copolymer having unpolymerized vinyl ester side chains and essentially free of polymerized vinyl ester side chains which comprises polymerizing (a) an acid selected from the group consisting of acrylic, methacrylic, crotonic, maleic and fumaric, and half esters of maleic and fumaric acids with (b) a comonomer polymerizable therewith, said comonomer having less than 25 carbon atoms, to form a carboxy copolymer, and subsequently dissolving the carboxy copolymer in and reacting the carboxy copolymer with a vinyl ester selected from the group consisting of vinyl acetate and vinyl propionate, said subsequent reaction being carried out in an excess of vinyl ester relative to carboxyl groups and in the presence of a polymerization inhibitor and a catalytic amount of a mercury salt of a strong acid.

2. A process for the preparation of a copolymer having unpolymerized vinyl ester side chains and essentially free of polymerized vinyl ester side chains which comprises polymerizing (a) an acid selected from the group consisting of acrylic, methacrylic, crotonic, maleic and fumaric, and half esters of maleic and fumaric acids with (b) a comonomer polymerizable therewith having a single vinylene group and less than 25 carbon atoms to form a carboxy copolymer, and subsequently dissolving the carboxy copolymer in and reacting the carboxy copolymer with a vinyl ester selected from the group consisting of vinyl acetate and vinyl propionate, and conducting said subsequent reaction in a ratio of at least three mols of vinyl ester per copolymer carboxyl group and in the presence of a polymerization inhibitor and 0.1 to 2 percent of a mercuric salt of a strong acid to form the vinyl ester copolymer by ester interchange.

3. A process for the preparation of a copolymer having unpolymerized vinyl ester side chains and essentially free of polymerized vinyl ester side chains which comprises dissolving (1) a copolymer of (a) an acid selected from the group consisting of acrylic, methacrylic, crotonic, maleic and fumaric, and half esters of maleic and fumaric acids and (b) a comonomer polymerizable therewith, said comonomer having less than 25 carbon atoms, in and reacting the copolymer with (2) a vinyl ester selected from the group consisting of vinyl acetate and vinyl propionate, and conducting said reaction in an excess relative to copolymer carboxyl groups to be converted of the vinyl acetate, and in the presence of a polymerization inhibitor and a catalytic amount of a mercury salt of a strong acid.

4. The vinyl ester copolymer produced by the process of claim 3.

5. A process for the preparation of a copolymer having unpolymerized vinyl ester side chains and essentially free of polymerized vinyl ester side chains which comprises dissolving (1) a copolymer of (a) an acid selected from the group consisting of acrylic, methacrylic, crotonic, maleic and fumaric, and half esters of maleic and fumaric acids and (b) a comonomer polymerizable therewith, said comonomer having less than 25 carbon atoms, in and reacting the copolymer with (2) a vinyl ester selected from the group consisting of vinyl acetate and vinyl propionate, and conducting said reaction using a ratio of three to five mols vinyl ester per copolymer carboxyl group and in the presence of a polymerization inhibitor 0.1 to 2 percent of a mercuric salt of a strong acid to form the vinyl ester copolymer by ester interchange.

6. The process of claim 1, wherein the acid is crotonic acid and the vinyl ester is vinyl acetate.

7. The process of claim 1, wherein the acid is acrylic acid and the vinyl ester is vinyl propionate.

References Cited by the Examiner
UNITED STATES PATENTS

| | | | |
|---|---|---|---|
| 2,299,862 | 10/1942 | Toussant et al. | 260—476 |
| 2,813,850 | 11/1957 | Van Dijk et al. | 260—94.9 |
| 2,966,480 | 12/1960 | Wechsler et al. | 260—78.5 |
| 3,002,953 | 10/1961 | Sixt | 260—78.5 |

FOREIGN PATENTS

| | | |
|---|---|---|
| 852,520 | 10/1960 | Great Britain. |
| 1,004,809 | 3/1957 | Germany. |

JOSEPH L. SCHOFER, *Primary Examiner.*

M. LIBERMAN, DONALD E. CZAJA, *Examiners.*